Sept. 8, 1931.  M. M. CLAYTON  1,822,128
BOX AND CLAMP THEREFOR
Filed April 5, 1930   2 Sheets-Sheet 1

Inventor
Martin M. Clayton
By his Attorneys
Cooper, Kerr & Dunham

Sept. 8, 1931.  M. M. CLAYTON  1,822,128
BOX AND CLAMP THEREFOR
Filed April 5, 1930   2 Sheets-Sheet 2
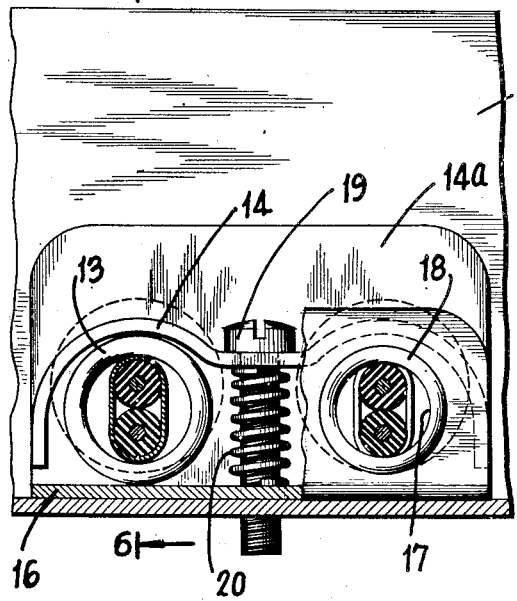
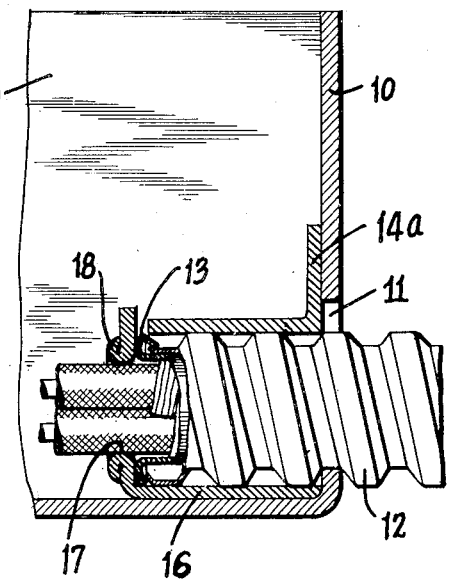
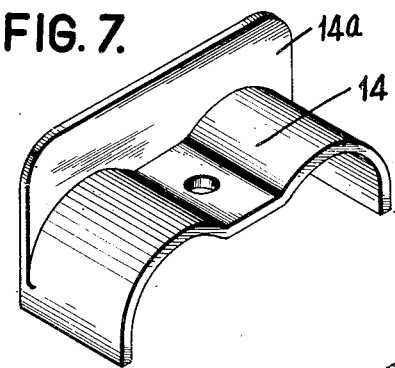
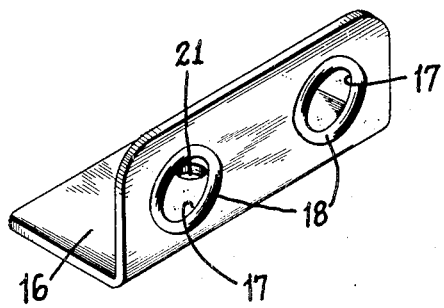
Inventor
Martin M. Clayton
By his Attorneys
Cooper, Kerr & Dunham Patented Sept. 8, 1931

1,822,128

UNITED STATES PATENT OFFICE

MARTIN M. CLAYTON, OF BADEN, PENNSYLVANIA, ASSIGNOR TO NATIONAL ELECTRIC PRODUCTS CORPORATION, OF NEW YORK, N. Y., A CORPORATION OF DELAWARE

BOX AND CLAMP THEREFOR

Application filed April 5, 1930. Serial No. 441,775.

This invention relates to outlet boxes equipped with clamping means for securing electrical cables to the same. Such boxes are now being made and sold in a great many types and sizes by many manufacturers of electrical material. In general these boxes are constructed with straight walls at right angles to the bottom with one or a pair of knock-outs close together in said walls and into which the cable or cables are entered. Also a clamp is employed to grip said cables against the bottom of the box and eyelet openings are provided to bush said cables which are either incorporated in the clamp or else placed in a strip which is secured to the box.

Manufacturing practice also generally requires that the knock-out opening or openings be placed in the wall of the box at a point somewhat above the level of the top of the bottom of the box.

When armored cable is used it is now also general practice to protect the wires of the cable from the edge of the armor at the ends of the armor by means of an insulating bushing which is inserted in the end of the armored cable. When such bushing is employed it is desirable that all gripping devices shall be so constructed that provision is afforded for visually inspecting the bushings when in assembled relation so that the electrical inspector may readily ascertain whether or not such bushings have been properly installed.

The present invention has for its object the provision of a box equipped with a clamping means which will properly grip cables entered into the box and which will also allow full visibility of the bushing from points above the bushing.

A further object of the present invention resides in the provision of a construction employing a filler plate in the box to align the cable and prevent tilting as it is clamped.

A further object of the present invention resides in the provision of an outlet box provided with a novel arrangement of clamping device and supplementing plate for securing novel results in a device of this class.

A further object of the present invention is to provide a construction in which the gripping face of the gripping or clamping device is disposed parallel to the bottom of the box to avoid forcing the cable down at an angle to the bottom of the box.

A further object of the present invention resides in the provision of a box provided with an eyelet or bushed hole in a part which is independent of the gripping means.

Further and other objects of the present invention will be hereinafter set forth in the accompanying specification and claims and shown in the drawings which by way of illustration show preferred embodiments of the invention.

In the drawings:

Fig. 5 is an end view taken substantially on lines 5—5 of Fig. 4;

Fig. 6 is detailed sectional view taken substantially on lines 6—6 of Fig. 5;

Fig. 7 is a perspective view of the clamping element; and

Fig. 8 is a perspective view of the filler and bushing plate.

Figure 1:
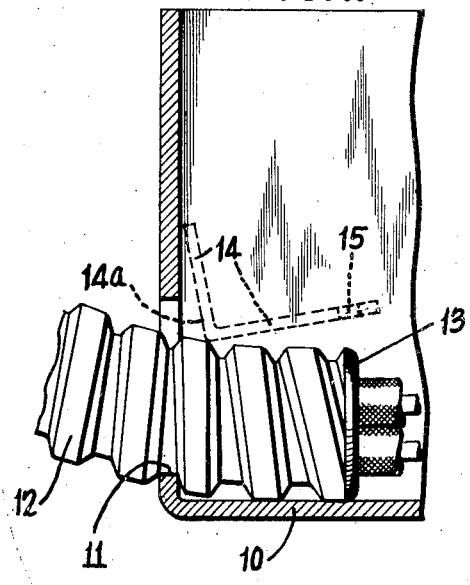
Figure 1 is a partial section of an outlet box showing the disposition of a knock-out aperture therein with relation to a cable entered into the knock-out aperture. This figure shows the undesirable tilting of the cable when the cable is clamped against the bottom of the box.

In more detail in the drawings, 10 represents an outlet box having a knock-out or knock-outs therein which upon removal afford a knock-out opening or openings 11 in the wall thereof. As shown in Fig. 1 the lower edge of the knock-out opening 11 after removal of the knock-out is an appreciable distance from the bottom of the box. Accordingly when an armored cable 12 is inserted into the knock-out opening the convolutions of the cable will rest upon the edge of the knock-out. Then if pressure is exerted on the top of the cable within the box the cable will rock on the edge of the knockout and will be pushed down at an angle against the bottom of the box. It will be understood that such pressure against the cable is exerted by the clamping means which is ordinarily utilized to hold the cable within the box. Such tipping of the cable produces undesirable effects which may be explained as follows.

In Fig. 1, 13 is the insulating bushing which is ordinarily disposed in the end of the armored cable. The part 14 shown in dotted lines represents a portion of the clamping element. Heretofore to provide visibility for the bushing, an inspection aperture 15 is provided in the clamping element 14. Since the cable is disposed at an angle in the bottom of the box the clamping element 14 must of necessity tip in order to properly grip the cable and the effect of the angle of the cable combined with the angle of the clamp makes the visibility of the bushing 14 through opening 15 uncertain and difficult. This tipping condition of the clamping element 14 also causes the clamp to have a rather poor grip on the cable and furthermore the back flanged portion 14a of the clamp does not properly cover and close the unused portion of the knock-out opening.

In order to obviate the foregoing objectionable defects in previous constructions, certain new and novel parts are employed which will now be described.

Figure 2:
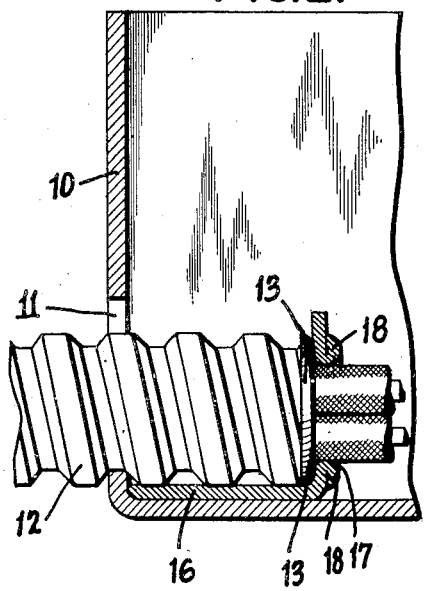
Fig. 2 shows a filler plate provided to obviate the tipping of the cable and cause it to enter horizontally into the box.

Referring to Fig. 2, 16 represents an L shaped angled plate or member provided with one or more openings 17 therein. Such openings are preferably provided with eyelet or bushed portions 18 which are turned over with a rounded edge to obviate sharp corners. These openings permit the cable wires to extend through the plate and prevent abrasion of the wires. The armored cable 12 is inserted through the knock-out opening 11 as before and placed over the bottom portion of member 16 in such a manner that the cable extends substantially horizontally in the box even if it is clamped down from the top.

Figure 3:
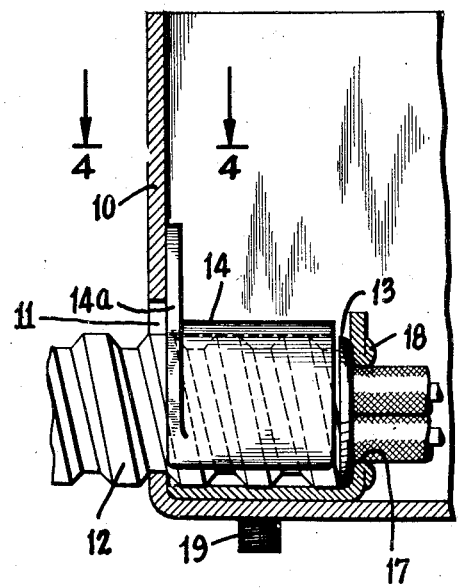
Fig. 3 is a view similar to Fig. 2 but with the clamping element in place.
Figure 4:
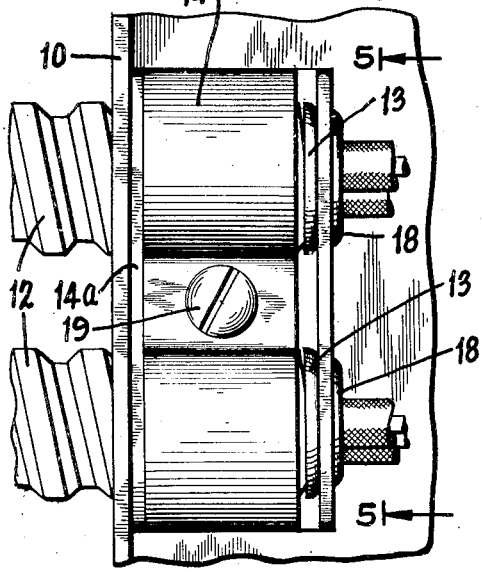
Fig. 4 is a top plan view of the assembly shown in Fig. 3, the view being taken substantially on lines 4—4 of Fig. 3.

Fig. 3 shows in section the complete assemblage. In this view the clamping element 14 (see Fig. 7) is in place over the top of the cable. It is preferably tightened against the cable by means of a screw 19 and if desired an intermediate spring 20 (see Fig. 5) may be provided intermediate the clamping member 14 and the bottom of the plate 16 to force the parts apart when the screw is backed out. 16 is preferably suitably apertured at 21 (see Fig. 8) to permit the passage of the screw 19 therethrough. When the filler element 16 is employed the clamp will press vertically down upon the cable without causing any tipping of the cable and accordingly tipping of the clamp is obviated so that the flange or shouldered portion 14a of the clamp closes the knock-out aperture above the cable. With this arrangement of clamp and with the upstanding part of filler part 16 so disposed with respect to the clamp that a definite space is provided between the right hand edge of the clamp and the left hand side of the upstanding part of 16 (see Fig. 4) it will be appreciated that the fibre bushing 13 is directly visible from the top of the box through the open space between the clamp and angle plate. Accordingly it is unnecessary to provide any inspection aperture or apertures in the clamp. The arrangement of the filler plate 16 also provides a back abutment for the bushings 13.

While I have shown and described a box with a plurality of knock-out openings and a construction of filler and abutment plate with a plurality of eyelet or bushed openings 17 opposite the knock-out openings it will be appreciated that the invention is not limited to a construction employing any particular number of knock-out openings or bushed openings. One or more could be employed as desired.

As shown in Figs. 2, 3, 5 and 6, the filler plate 16 is disposed so that its top surface is definitely below the lower edge of the knock-out opening and the plate is so located that the space from the bottom edge of the knock-out opening to the top surface of the filler plate is the same as the distance from the top to the bottom of a groove of a convolution of the cable 12. This disposition of the parts permits the cable to lie parallel with the bottom of the box when it is clamped and yet be definitely hooked over the edge of the knock-out.

What I claim is:

1. An outlet box having wall and bottom portions, a wall of said box being provided with a knockout opening having one edge slightly above the bottom of the box, and means for clamping a bushed armored cable in said box and preserving a correct relation of the cable for proper clamping of the bushing and for visual inspection, comprising an L-shaped plate with one portion underlying the cable and another portion upstanding from the first and provided with an aperture disposed opposite from the knockout opening and through which the cable wires may pass and a clamping element cooperating with the top of the cable having means associated therewith for forcing the cable against the portion of the L-shaped plate which underlies the cable, said clamping element being spaced from the upstanding part of the angle plate to provide for direct visual inspection of a bushing in the cable.

2. An outlet box with a knock-out opening therein and with an upstanding part therein affording a back abutment for an armored cable inserted through the knock-out opening and provided with a bushing which is in abutting proximity to the upstanding part, and a clamping means to clamp the cable in the box having its edge portion adjacent the upstanding part and spaced therefrom with definite spacing to provide for direct visual inspection of the bushing from above.

In testimony whereof I hereto affix my signature.

MARTIN M. CLAYTON.